(12) United States Patent
Foster (10) Patent No.: US 10,167,843 B2
(45) Date of Patent: Jan. 1, 2019

(54) WAVE POWERED GENERATOR (71) Applicant: Marine Power Systems Ltd, Swansea (GB)

(72) Inventor: Graham Foster, Swansea (GB)

(73) Assignee: Marine Power Systems Limited, Swansea (GB)

(*) Notice: Subject to any disclaimer, the term of this patent is extended or adjusted under 35 U.S.C. 154(b) by 1162 days.

(21) Appl. No.: 14/357,102

(22) PCT Filed: Nov. 8, 2012

(86) PCT No.: PCT/GB2012/052775
§ 371 (c)(1),
(2) Date: May 8, 2014

(87) PCT Pub. No.: WO2013/068748
PCT Pub. Date: May 16, 2013

(65) Prior Publication Data
US 2015/0000263 A1    Jan. 1, 2015

(30) Foreign Application Priority Data
Nov. 8, 2011  (GB) .................... 1119292.9

(51) Int. Cl.
*F03B 13/18* (2006.01)
*F03B 13/16* (2006.01)
*F03B 13/20* (2006.01)

(52) U.S. Cl.
CPC .......... *F03B 13/1885* (2013.01); *F03B 13/16* (2013.01); *F03B 13/20* (2013.01); *Y02E 10/38* (2013.01)

(58) Field of Classification Search
CPC .......... Y02E 10/38; F03B 13/12; F03B 13/14; F03B 13/16; F03B 13/18; F03B 13/20; F03B 13/1885; F03B 13/189
(Continued)

(56) References Cited

U.S. PATENT DOCUMENTS 6,109,029 A * 8/2000 Vowles .................. B01D 61/10
                                                        270/42
2007/0266704 A1  11/2007 Bull et al.
(Continued)

FOREIGN PATENT DOCUMENTS

AU    5581273 A    11/1974
FR    2892431 A1    4/2007
(Continued)

*Primary Examiner* — Mark Laurenzi
*Assistant Examiner* — Mickey France
(74) *Attorney, Agent, or Firm* — Larson & Anderson, LLC (57) ABSTRACT

The generator comprises: at least one energy capturing float (2) which is movable in response to wave motion; a reaction member (1) to be positioned below the energy capturing float; connecting lines (4a, 4b,4c,4d) for connecting the at least one energy capturing float to the reaction member and defining a spacing (D3) between the energy capturing float and the reaction member; energy converters (3a,3b,3c,3d) for converting relative movement between the reaction member and at least one respective energy capturing float to useful energy. The generator includes depth setting means such as adjustable lines (8a,8b) connected to auxiliary floats (7a,7b) or adjustable mooring lines (9a,9b 9c,9d) securing the reaction member to the sea bed B for setting the depth (D1) of the reaction member in the sea.

23 Claims, 10 Drawing Sheets (58) Field of Classification Search
USPC ................ 290/42, 53; 60/495–507; 417/100, 417/330–337
See application file for complete search history.

(56) References Cited

U.S. PATENT DOCUMENTS

| | | |
|---|---|---|
| 2008/0093852 A1 | 4/2008 | Vowles et al. |
| 2011/0012358 A1 | 1/2011 | Brewster et al. |
| 2012/0090313 A1* | 4/2012 | Myklebust .............. B63B 21/50 60/505 |

FOREIGN PATENT DOCUMENTS

| | | |
|---|---|---|
| GB | 2015657 A | 9/1979 |
| GB | 2414771 A | 12/2005 |
| WO | 2010007418 A2 | 1/2010 |
| WO | 2011065841 A1 | 6/2011 |

* cited by examiner

WAVE POWERED GENERATOR

The present invention relates to generators that can be used to extract energy from waves in a body of water, by converting the wave energy to more readily usable energy.

In recent years, there has been increased emphasis on the need to exploit renewable energy so that it significantly contributes to global energy production. A combination of government targets, media representation of the issues associated with non-renewable energy sources, and ever increasing energy costs have all created a powerful driving force for the development of renewable energy systems.

Negative impacts of fossil fuels on our environment are well known, as are the problems and high costs associated with nuclear energy. Harnessing of the huge natural abundance of renewable energy on the other hand is constrained merely by our capability of capturing and supplying it at an economically viable price.

One potential renewable energy source is wave power— an abundant and consistent energy resource available in all of the world's large oceans and seas. Various wave devices for generating energy from wave power have been proposed, but such devices have many limitations with no one device having the proven ability to reliably exploit the available wave power resource over the long term.

We have disclosed in WO2010007418 an improved generator for converting wave motion to useful energy. The generator disclosed uses a submersible reaction body to solve many of the difficulties associated with existing wave energy converters.

However, the wave energy converter disclosed in WO2010007418 still has potential for further improvement. Specifically, the apparatus described and illustrated in WO2010007418 has an energy capturing float that remains on the sea surface continuously, all the time. This means that in highly energetic sea conditions, such as storms, the float will be subject to high loads. These high loads must be managed by the structure and the power take-off system, resulting in costly over-engineering of the apparatus.

We have now devised a generator for converting wave motion in a body of water to useful energy, the generator having adjustable geometry that allows the main power capturing float to capture less energy in sea conditions that are more energetic than that required for the generator to achieve its rated power.

Furthermore, our simulation work has shown that the ability to vary the geometry of the apparatus allows the tuning of the system to respond optimally to different sea states. The known generator described in the abovementioned WO2010007418 comprises a generator for converting wave motion in a body of water to useful energy, the generator comprising:

at least one energy capturing float which is movable in response to the wave motion, a reaction member to be positioned below the energy capturing float;

one or more connectors for connecting the energy capturing float to the reaction member and to define a spacing between the energy capturing float and the reaction member; and energy conversion means for converting relative movement between the subsurface reaction member and a respective energy capturing float to the useful energy.

According to the invention, the generator includes adaptable setting means for setting, over a predetermined range, the depth of the reaction member in the body of water. The setting means further is arranged to set the height of the reaction member from the bed of the body of water.

By "setting the depth" we mean controlling in a manner whereby the precise depth can be chosen and fixed in a modifiable manner. In other words, if it is wished to change the set depth, the setting means may be adapted, modified and controlled such that a further precise depth can be chosen and fixed.

In a first embodiment of the invention, the depth setting means comprise at least one flexible attachment line of adjustable length each attached to a respective buoyancy float (the latter being auxiliary to and distinct from the energy capturing float). In this embodiment, the generator has a net negative buoyancy that is supported by the auxiliary float on the surface of the body of water.

In a second embodiment of the invention, the depth setting means comprise at least one flexible mooring line of adjustable length to adjustably secure the reaction member to a bed B of the body of water. In this embodiment, the generator has a net positive buoyancy that is resisted by tension of the flexible mooring line(s).

In either embodiment, the depth setting means is preferably coupled to the reaction member by one or more winches.

Preferably, the connectors in the generator according to the invention include at least one flexible line, which is mounted to the reaction member by a respective pulley for the or each flexible line. Preferably also the or each line is of adjustable length, the length adjustment being typically achieved by winding the or each line around a respective drum. Thus the distance between the reaction member and the energy capturing float can be adjusted by winding the connector lines on or off the respective drums.

In preferred embodiments of the invention the connectors are of adjustable length so as to permit independent adjustment of the distance (or spacing in a vertical direction) between the energy capturing float and the reaction member, and therefore the depth of the energy capturing float in the body of water. It is further preferred that the connectors are adjustably mounted to the reaction member such that the geometry of the connection (such as the acute angle between the connector and the horizontal) can be selectively altered. The adjustable mounting is preferably by at least one primary connection point (such as a pulley) to the reaction member in a respective track that permits movement of the connection point across the reaction member. The pulley may, for example, be movable in the track by a rack and pinion arrangement (such as a driven pinion on the pulley and a complementary fixed rack on the reaction member).

Thus, the pulley(s) may be moved towards or away from the periphery of the reaction member. As a respective pulley is moved towards the periphery, the internal (generally acute) angle between the connector and the horizontal— (which is typically the same as the orientation of the top surface of the reaction member) is reduced. This adjustment of the pulley position will affect the distance between the energy capturing float and the reaction member; such adjustment can be made in conjunction with, or compensated by, adjustment of the length of the connector lines.

It is preferred that the energy capturing float is arranged for variation of its mass thereof by varying the proportion of air and water that it contains (typically by provision of an air supply to the energy capturing float from the reaction member and an air supply to the reaction member from the surface of the body of water (such as the sea) on which the generator according to the invention is deployed.

It is furthermore preferred that the reaction member has adjustable buoyancy and a plurality of buoyancy modes, including at least one submerged operating mode in which the reaction member is suspended from the buoyancy float, and a maximum buoyancy mode in which the reaction member floats on the surface of the body of water. In any of these plurality of buoyancy modes, the reaction member should have inertia and drag to resist potential movement of the energy capturing float caused by the wave motion.

Preferred embodiments of the invention will now be described in more detail, with reference to the accompanying drawings, in which like parts are denoted by like reference numerals throughout. In order to avoid detracting from the clarity of the drawings, not all parts are labelled in all drawings. In the drawings.

Figure 1:
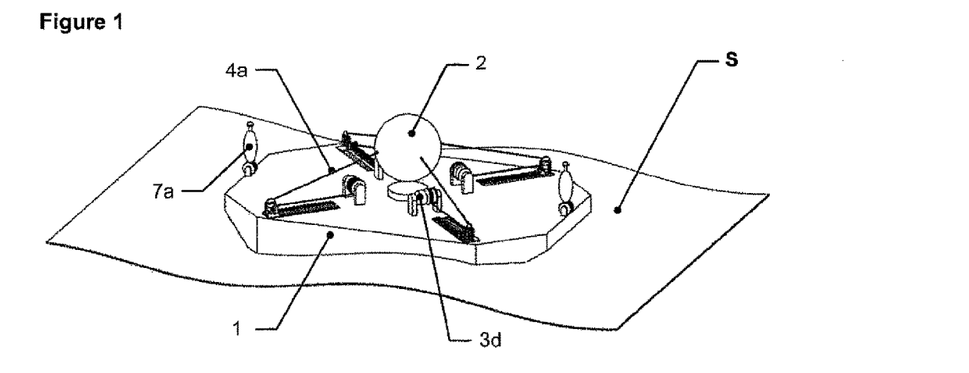
FIG. 1 is a perspective view of a preferred embodiment of wave generator according to the invention when on the surface of a body of water (generally, the sea)
Figure 2:
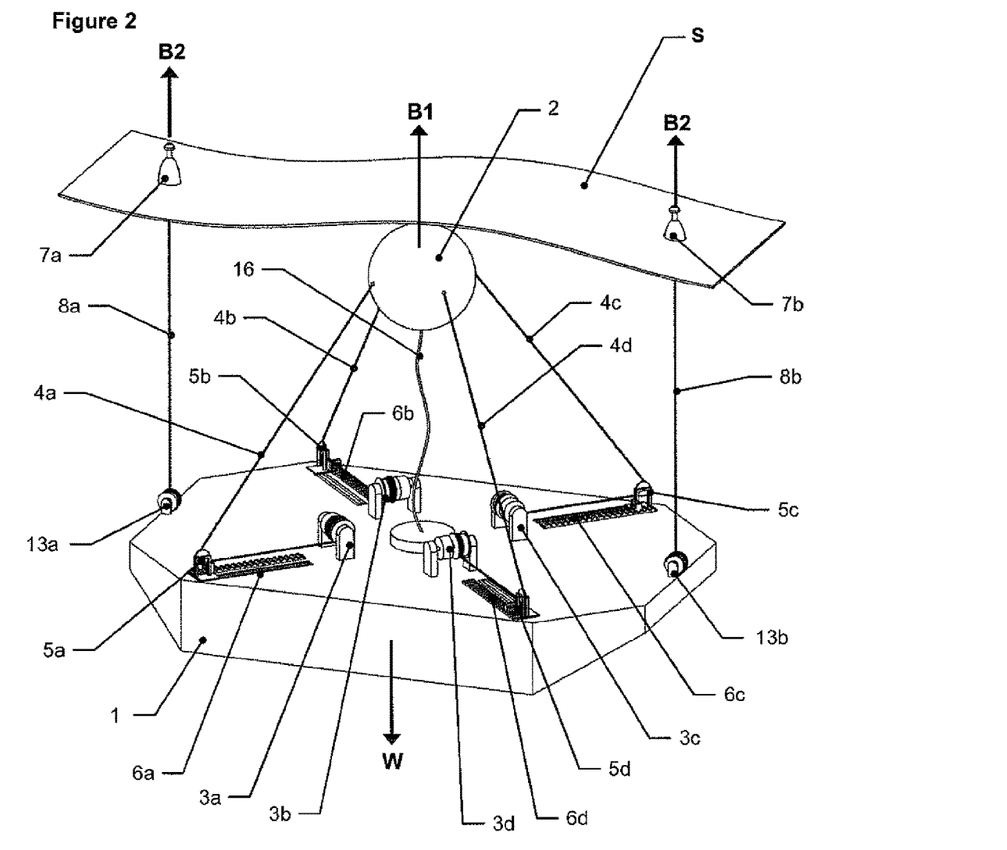
FIG. 2 is a perspective view of the wave generator of FIG. 1 when submerged beneath the surface of that body of water.

Referring first to FIGS. 1 and 2, there is shown an exemplary wave powered generator according to the invention which comprises a submersible subsea reaction member 1; an energy capturing float 2 that moves in response to the waves; a series of energy converters 3a, 3b,3c, 3d mounted on the reaction member 1; and respective connecting lines 4a, 4b, 4c,4d of adjustable length that connect the energy capturing float 2 to the respective energy converter 3a, 3b,3c, 3d via a respective pulley 5a, 5b, 5c, 5d. Each of the pulleys is adjustably mounted on a respective track 6a, 6b, 6c, 6d whereby the respective pulley can be moved either towards or away from the periphery of the reaction member 1.

In the arrangement shown in FIG. 1, each of the connecting lines 4a,4b,4c,4d is wound around a drum (such as drum 11a—see FIG. 5) on the respective energy converter 3a,3b, 3c,3d to the fullest or maximum extent such that the spacing between the energy capturing float 2 and the reaction member 1 is at a minimum. In this case the reaction member 1 and the energy capturing float are together floating on the surface S of a body of water.

Conversely, in the arrangement shown in FIG. 2, each of the connecting lines 4a,4b,4c,4d is let out (partially unwound around the respective drum) such that there is spacing between the energy capturing float 2 and the reaction member 1. In this case, the energy capturing float 2 is shown just below the surface S of the body of water.

In the embodiment illustrated in FIGS. 1 and 2, the generator further includes two (non energy-capturing or auxiliary) surface floats 7a, 7b; each with a corresponding depth setting line 8a, 8b (see FIG. 2) of adjustable length that connects the respective surface float 7a, 7b to the reaction member 1. The depth setting lines 8a, 8b can be adjusted by respective winches 13a,13b, thereby allowing control over their length and therefore the depth of the reaction member 1, as will be described later. FIG. 2 also shows an umbilical for connection between the reaction member 1 and the energy capturing float, the purpose of which will be described with reference to subsequent Figures.

Figure 3:
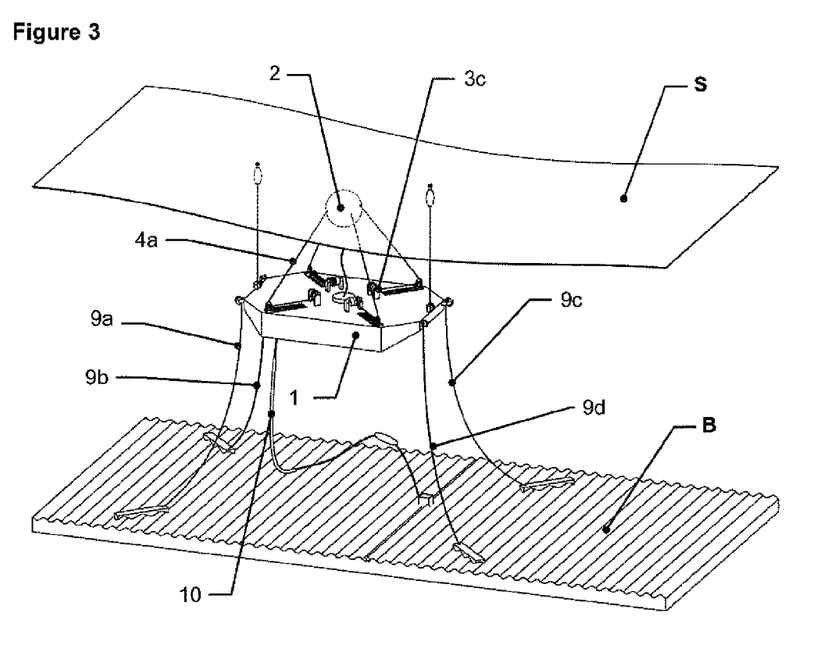
FIG. 3 is a further perspective view showing the energy converter of FIG. 2 moored to the bed of the body of water.
Figure 4:
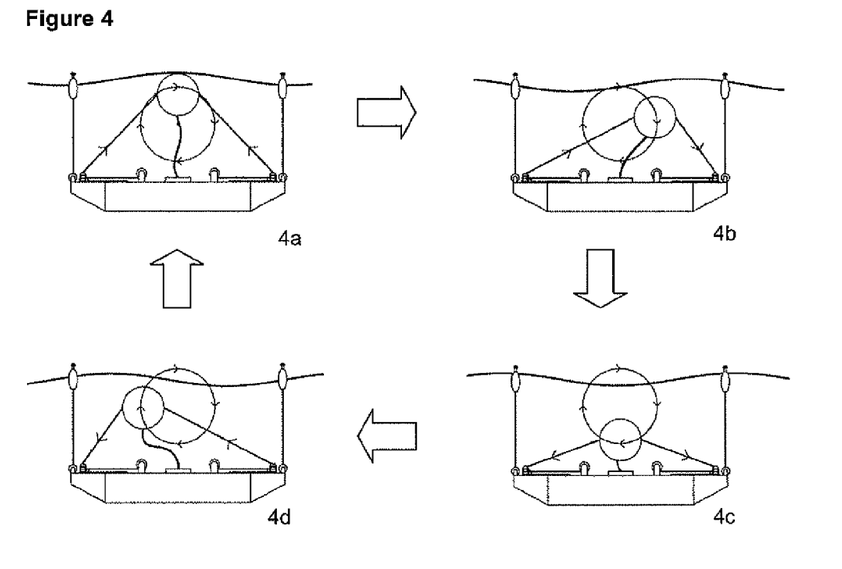
FIGS. 4a to 4d shows schematically an operating cycle for a wave generator according to the invention.

FIG. 3 shows the wave energy generator of FIG. 2 (again with the energy capturing float 2 spaced from the reaction member 1) together with mooring lines 9a, 9b,9c,9d which tether the generator to the seabed B, thereby keeping the generator on station. A power umbilical 10 is further provided to allow the energy generated by the generator to be delivered to a location where it can be used.

The mooring lines 9a,9b,9c,9d may be connected to the reaction body 1 via length adjusting means such that excess slack in the respective mooring lines can be taken up by the reaction member 1 when the depth of submersion of the reaction member 1 is varied.

It should be noted that in the first embodiment of the invention the mooring lines 9a,9b,9c,9d remain slack at all times so that the generator can move freely up and down in the water column as adjusted by the depth setting lines 8a and 8b connected to floats 7a,7b.

An elbow (not shown) may be created in the mooring lines by adding a 'floater' (a buoyant body) or a sinker (a weighted body) to the mooring lines 9a,9b,9c,9d to permit further freedom of movement of the generator whilst ensuring that the respective mooring lines remain generally slack.

The mooring lines 9a, 9b,9c,9d and power umbilical 10 are not directly related to the inventive features of the first embodiment of the apparatus so therefore will be omitted from further figures describing the first embodiment in the interests of clarity.

The reaction member 1 is generally of a hollow construction and is adapted to be selectively filled with air or water to adjust its buoyancy. The wave powered generator according to the invention can therefore have a submersed operating configuration in which the reaction member 1 is full or mostly full of water, and a buoyant surface configuration in which the reaction member 1 is full or mostly full of air.

When in the buoyant surface configuration (FIG. 1), the reaction member 1 floats on the surface S of the body of water (such as the sea) with sufficient buoyancy for it to carry all other components of the apparatus. In this condition the generator according to the invention can be readily transported across the surface S of the body of water. The wave powered generator can sit sufficiently high in the water that all connections to mooring lines 9a,9b,9c,9d and power umbilical 10 can be clear of the water and be easily accessible. The wave powered generator can also create its own stable service platform with all serviceable components clear of the water to enable easy access for maintenance.

With reference to FIG. 2, when the wave generator is in the submersed operating configuration, the reaction member 1 is suspended from the combination of the energy capturing float 2 and the surface floats 7a,7b. Therefore the weight W of the reaction member 1 is equal to or less than the buoyancy B1 of the energy capturing float 2 plus the buoyancy B2 of the surface floats 7a,7b.

The large volume of sea water contained in the reaction member 1 imparts to the member a corresponding large mass, and therefore inertia, without increasing its weight W. In addition, the reaction member 1 has a large surface area perpendicular to the direction of the heave force, which thereby provides further resistance to movement by way of a large drag and added mass.

Generally, the combined size of the surface floats 7a, 7b is less than that of the energy capturing float 2, and therefore the buoyancy B2 of the surface floats 7a,7b will be less than the buoyancy B1 of the energy capturing float 2.

Because the surface floats 7 are smaller than the energy capturing float 2, they do not transfer significant loads to the main structure of the reaction member 1 even in very large wave conditions. The shape of the surface floats 7 can also be such that they have a poor ability to capture wave energy.

The reaction member 1 may be suspended from the energy capturing float 2 and the surface floats 7a,7b at a depth D1 (see FIGS. 7 to 11) sufficient to ensure that the reaction member is generally below the influence of waves on the sea surface. Therefore movement of the energy capturing float 2 caused by waves results in relative motion between the energy capturing float 2 and the reaction member 1. This movement is taken up by respective working strokes of the energy converters 3a,3b,3c,3d and thus exploited to produce power.

In the illustrated embodiment, a single float 2 is shown, but it will be understood that more than one such float can be provided if appropriate, each with its own series of energy converters mounted on the reaction member 1, together with respective connecting lines, pulleys and tracks.

With reference to FIGS. 4a to 4d, the movement of the energy capturing float 2 in response to the waves is shown in more detail. The geometry of the apparatus is simplified in this figure to show the operating principle clearly. Generally, the float 2 follows the orbital motion of the wave particles in an approximately circular path between successive wave peaks, in the sequence shown in arrows, from FIG. 4a to FIG. 4b, then to FIG. 4c, then to FIG. 4d and then completing a first cycle to FIG. 4a. As the energy capturing float 2 moves with the waves, its distance to the centre of the reaction member 1 changes, both horizontally and vertically. This leads to a change in the length of the connecting lines 4a,4b,4c and 4d under the influence of the waves, which in turn is harnessed by the respective energy converters 3a, 3b,3c,3d to generate useful power. The way in which the length of the connecting lines 4a,4b,4c,4d changes is illustrated by arrows in FIGS. 4a, 4b,4c and 4d. It should be noted that whilst the motion of the float 2 shown in FIGS. 4a, 4b, 4c and 4d is approximately in a circular orbit, it may be the case that the float 2 moves substantially more in surge (horizontally) or heave (vertically) depending on the sea state.

Figure 5:
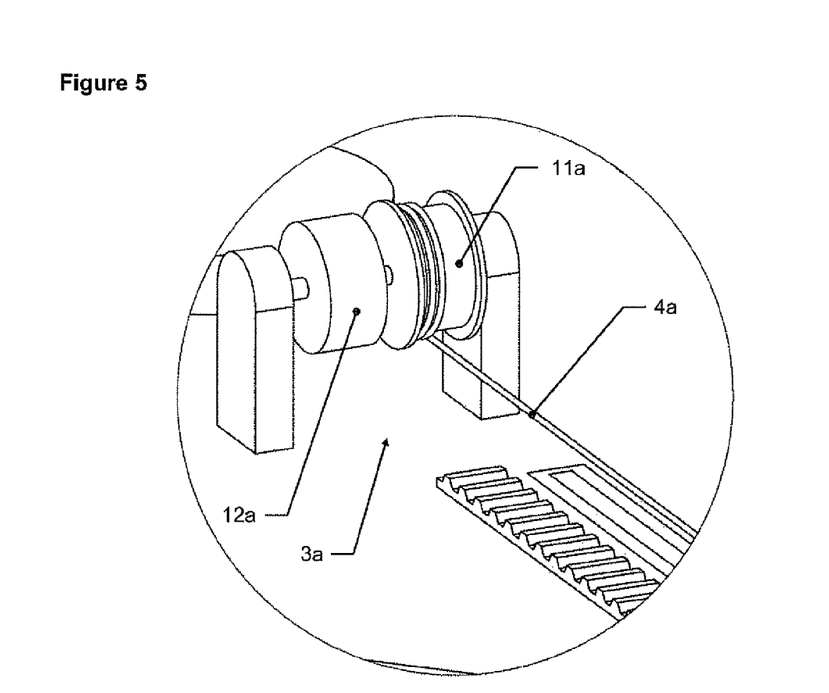
FIG. 5 shows in more detail one of the energy converters forming part of the wave generator shown in FIG. 1.

With reference to FIG. 5, which is a close up view of one of the energy converters 3a, the latter works by having the respective connecting line 4a wound around a drum 11a attached to a corresponding hydraulic motor 12a. The hydraulic motor 12a is turned by the connecting line 4a turning the drum 11a as the energy capturing float 2 is moved by the waves. When the hydraulic motor 12a (and other similar motors associated with other energy converters 3b, 3c, 3d etc) is turned under an external force, the relevant motor becomes a hydraulic generator which creates high pressure hydraulic force which can be used to perform useful work, for example turning an electrical generator.

A hydraulic pre-load can be used to create a biasing force on the respective hydraulic motor 12a that will wind the respective connecting line 4a back onto the drum 11a when the force from the waves is moving the float 2 in a direction that shortens the length of the respective connecting line 4a.

Figure 6:
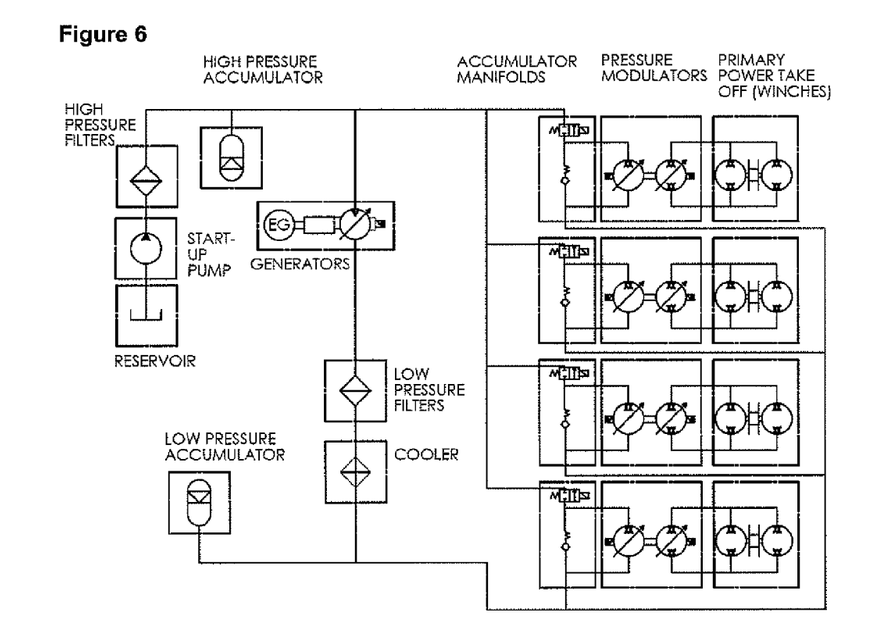
FIG. 6 shows an exemplary hydraulic circuit for use in the wave generator according to the invention.

An exemplary hydraulic circuit that can achieve the above requirements is shown in FIG. 6. This circuit allows the creation of hydraulic fluid flow from the forced turning of a hydraulic motor 12a, the conversion of the created hydraulic fluid flow to electricity, and the creation of a pre-load on the hydraulic motor 12a.

The components of such a hydraulic circuit are well known and do not form part of the invention. However, in the exemplary hydraulic circuit, the hydraulic motor 12a is connected via pressure modulators which control the pressure between the hydraulic motor and the rest of the system. High pressure and low pressure accumulators are used as short term energy storage to smooth the variable power supply provided through a wave cycle and to provide reactive power to the winches. Fluid is passed from the high pressure side of the circuit to the low pressure side through a variable speed hydraulic motor which is used to turn an electrical generator. This electrical generator could take electrical power in and act as a motor to provide power to the variable speed hydraulic motor, providing reactive power to the system. Hydraulic fluid is stored in a reservoir and is passed through filters to maintain the quality of the fluid used in the system. A start-up pump is also provided to supply initial pressure to the system.

The drum 11a (and similar drums) also provide the facility for storage of the respective connecting line 4a (and corresponding similar connecting lines, such as those shown in other Figures) and thus facilitate the adjustment of its length. When the connecting line 4a is to be shortened, multiple turns of the connecting line are kept on the drum to a point where a minimum length is reached when the energy capture float 2 makes contact with the reaction member 1. When the connecting line 4a is to be lengthened, less turns of the connecting line are kept on the drum to a point where maximum length is reached and no line 4a is stored on the drum 11a. (Equivalent take up and letting out of all other lines 4b, 4c,4d occur on all other corresponding energy converters via similar drums, not shown.)

It should be appreciated that many other types of length adjusting and power take off mechanisms may be used in place of the energy converters 3a, 3b,3c 3d described with reference to the illustrated embodiment of the invention; the system described here is to exemplify a practically realisable method for both converting energy and adjusting the length of the respective connecting lines 4a, 4b,4c,4d.

For example, hydraulic cylinders or linear generators may be in used place of the hydraulic motors, with an intermediary line storage drum used to adjust the length of the corresponding connecting lines. Furthermore separate physical springs may be substituted for the hydraulic preload used in the first exemplary embodiment of the invention.

Because the connecting lines 4a,4b,4c,4d and the depth setting lines 8a, 8b are all adjustable in length, the depth D2 of the both the energy capturing float 2 and the depth D1 of the reaction member 1 can be altered independently of each other whilst the entire apparatus remains afloat. This is an important feature of the embodiment described.

The depth setting lines 8a, 8b can be adjusted by respective winches 13a,13b, thereby allowing control over their length and therefore the depth D1 of the reaction member 1. The length of the connecting lines 4a,4b,4c,4d, and therefore the depth D2 of the energy capturing float 2, can be adjusted by the respective energy converters 3a, 3b,3c,3d via the storage of the respective lines on drums such as drum 11a, which are parts of the respective energy converter.

When the generator according to the invention is in operation and the respective lengths of the connecting lines 4a,4b,4c,4d are constantly changing due to the motion of the waves, it is the neutral or mid stroke position that is controlled by the energy converters 3a,3b,3c,3d, and therefore the average depth D2 of the energy capturing float 2 that is adjusted.

The drum 11a (and similar drums) or the respective motors 12a etc. can be rotationally encoded so that the exact amount of connecting line 4a, 4b,4c,4d etc on the respective drum is known by the relevant control system of the generator at all times. Therefore when a length adjustment is desired, the control system can instruct the motor 12a or similar motors to reel-in or play-out the respective connecting line 4a. (The hydraulic energy conversion circuit described above allows for the hydraulic motors to be powered when the generator according to the invention is not generating power from wave motion.)

If the generator is in use and the lengths of the connecting lines are constantly changing, then the control system will monitor the average length of the connecting lines 4a,4b, 4c,4d (as described above). In this case, if an adjustment of the average length is desired then the control system can modulate the biasing force in the hydraulic motor such that the connecting lines 4a,4b,4c,4d are more easily played-out than reeled-in (to lengthen the connecting lines), or more strongly reeled in than played-out (to shorten the connecting lines). When the desired average line length is reached the control system will return the biasing force in the motor 12a and similar motors to an equilibrium such that the reeling-in and playing-out of the connecting lines 4a,4b,4c,4d caused by the waves is equal. (The hydraulic energy conversion circuit described above allows for the hydraulic biasing force to be modulated in suitable manner to achieve this effect.)

The above described mechanism by which the depth D1 of the reaction member 1 and depth D2 of the energy capturing floats 2 can be altered allows the energy capturing properties of the generator to be altered depending on the sea state (a given sea state is the combination of the wave height and the wave period in the sea, with both wave height and wave period being able to vary independently of each other).

How this ability of the apparatus to alter its geometry in response to the sea state effects its energy capturing properties will be described further below.

Firstly, the way in which the generator according to the invention can adjust its energy capturing properties in response to wave height will be described, and in particular how the apparatus can limit the energy captured in extreme sea states. Secondly, the ability of the generator according to the invention to adjust its response in response to wave period will be described.

Figure 7:
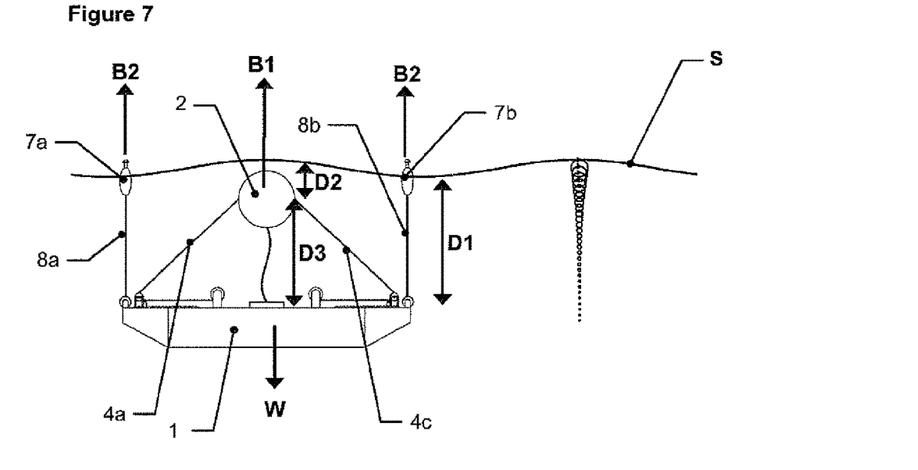
FIG. 7 shows operation of a wave generator according to the invention near the surface in small waves.
Figure 8:
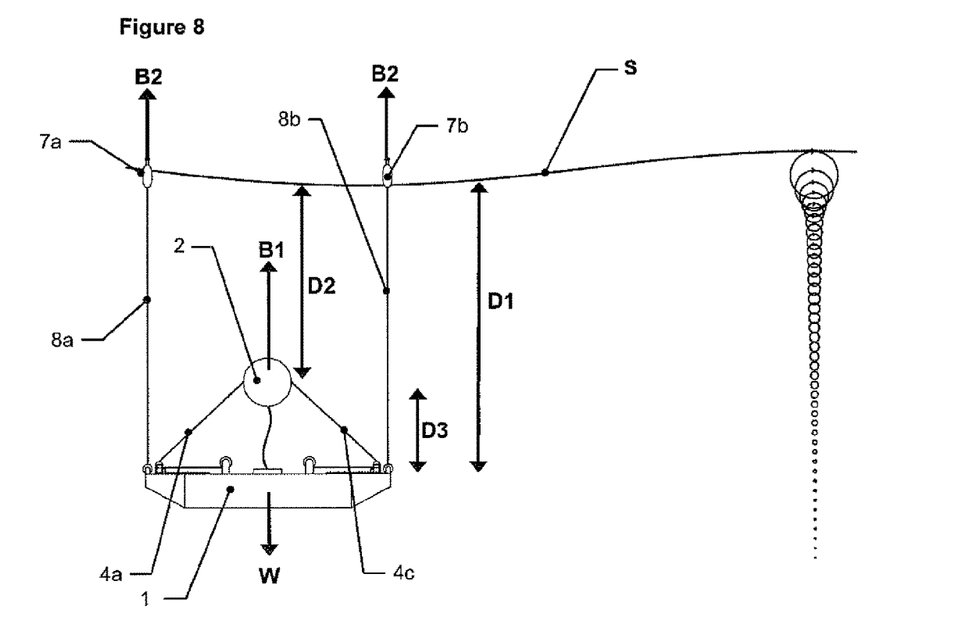
FIG. 8 shows operation of a wave generator according to the invention mid-water in larger waves.
Figure 9:
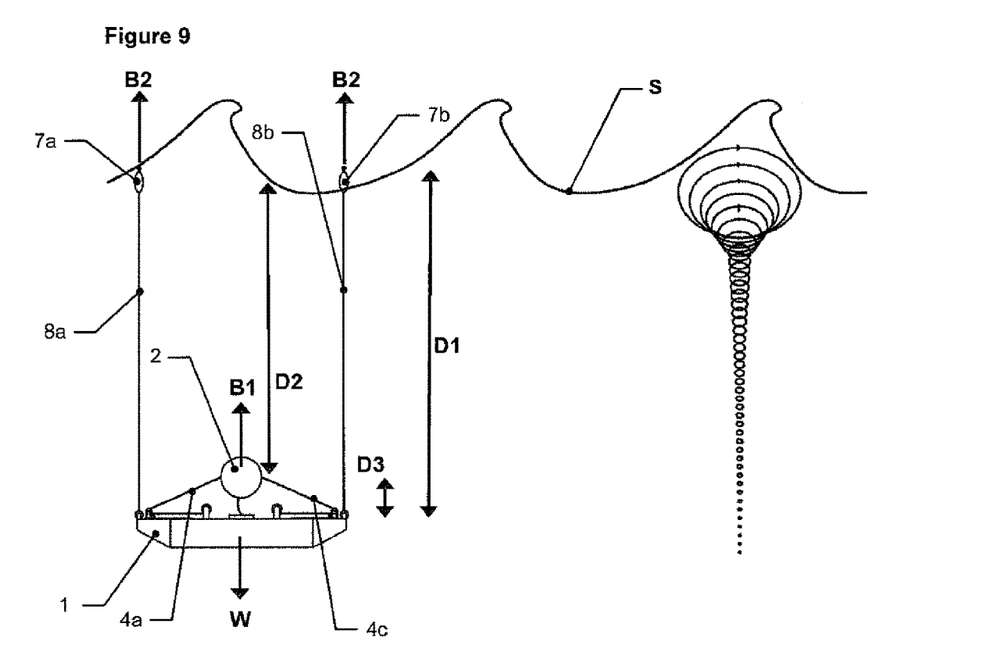
FIG. 9 shows operation of a wave generator according to the invention deep underwater in storm waves.

Referring to FIGS. 7 to 9 the way in which energy capture can be adjusted in response to the wave height is described more detail. As an aid, the distribution of the energy in the water column is shown illustratively (not to scale) alongside the representation of the generator according to the invention.

As is well known, wave energy is an orbital movement of water particles, the orbital movement propagating in the direction of the wave travel. As the wave height increases, the particle orbit becomes larger, and the velocities of the particles also become larger. The wave energy (i.e. the magnitude of the particle orbits) is greatest at the surface and rapidly decreases with depth.

With reference to FIG. 7, in small wave heights, by appropriate lengthening or letting out of the connection lines 4a, 4b,4c,4d, the depth D2 of the energy capturing float 2 can be very shallow (on or close to the surface S of the sea) in order to maximise the energy captured.

With reference to FIG. 8, in moderate to large wave heights, the connection lines 4a,4b,4c,4d may be partially drawn in, so that the depth D2 of the energy capturing float 2 is deeper with decreased wave energy relative to that at the surface, thereby, the structure of the apparatus should not be subject to excess loads and the power take of mechanism should not have to deal with an excess of energy above its rated power.

With reference to FIG. 9, in storm conditions (very large wave heights) the connection lines 4a,4b,4c,4d may be fully drawn in so that the energy capturing float 2 and reaction member 1 can be descended to a maximum depth, at which the risk of a very large wave causing damage to the apparatus may be mitigated.

It should be further noted that the wave period as well as the wave size influences the amount of energy in the waves, therefore the float depth can also be adjusted to wave period as well.

The way in which the apparatus according to the invention adjusts its geometry specifically in response to sea state period will now be described further. It is the objective of these adjustments to provide optimum energy capturing response to the ongoing sea state period—this is often referred to as tuning.

A first mechanism by which the apparatus can tune its response to sea state period will be described with reference to FIGS. 10 and 11.

Figure 10:
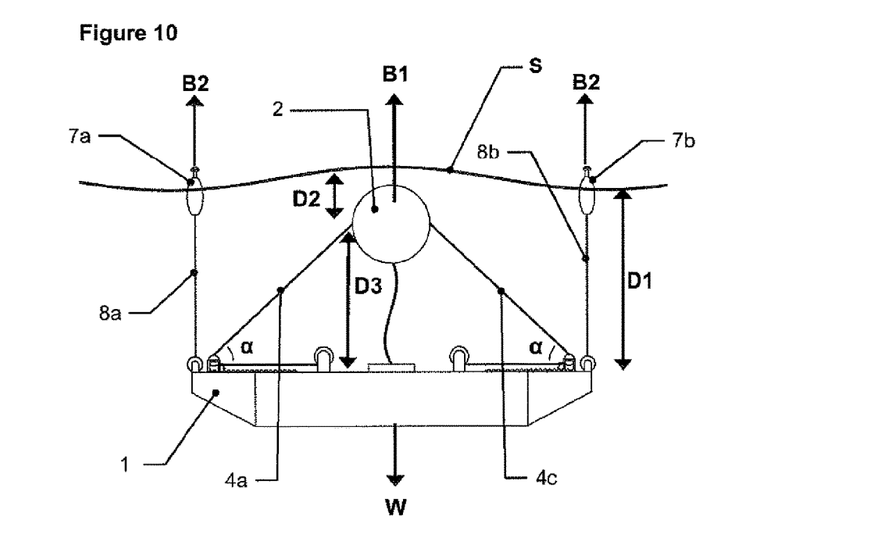
FIG. 10 shows operation of a wave generator according to the invention with a relatively short distance (spacing) between the reaction member and the energy capturing float.

Referring to FIG. 10, in waves having short period, the distance D3 between the energy capturing float 2 and the reaction member 1 is reduced. This changes the geometry of the system such that the angle α of each of the connecting lines 4a, 4b,4c,4d to the horizontal is less, which increases the constraint on the float 2 and consequently reduces the natural frequency of the system—making the response of the energy capturing float 2 better tuned to short period sea states.

Figure 11:
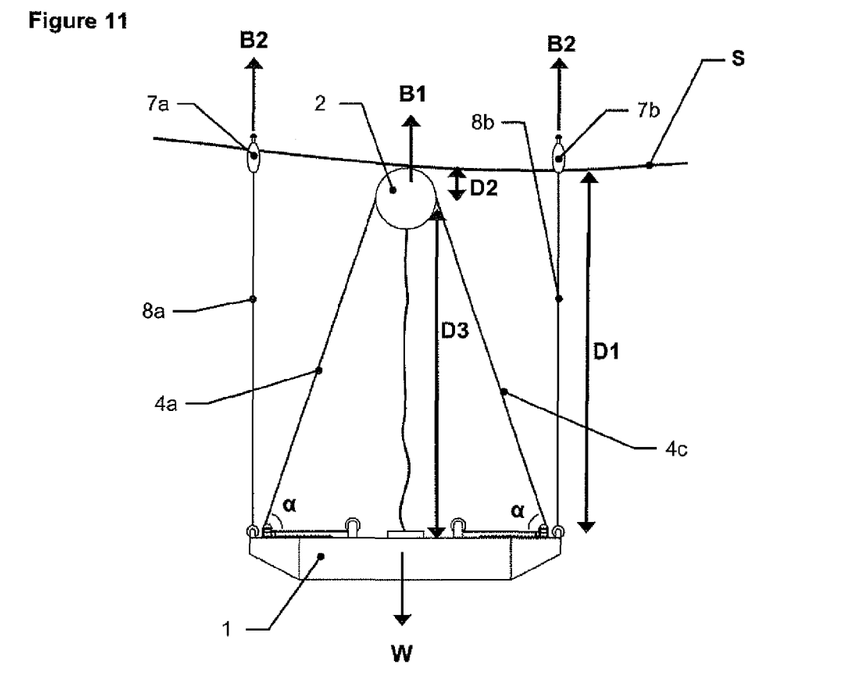
FIG. 11 shows operation of a wave generator according to the invention with a relatively large spacing between the reaction member and the energy capturing float.

Referring to FIG. 11, in long period waves the distance between the energy capturing float 2 and the reaction member 1 is lengthened. This changes the geometry of the system such that the angle α of the connecting lines 4 to the horizontal is greater, which reduces the constraint on the float 2 and consequently increases the natural frequency of the system—making the response of the energy capturing float 2 better tuned to long period sea states.

Figure 12:
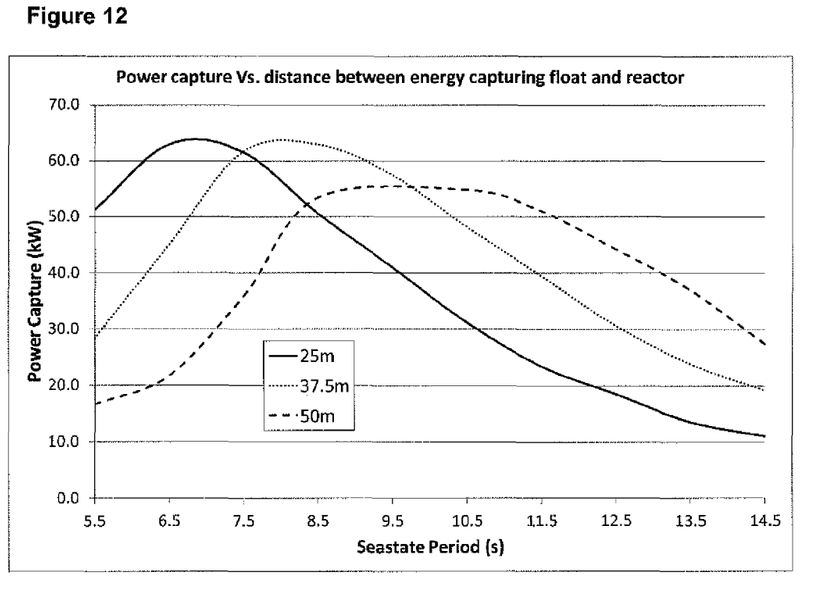
FIG. 12 is a graph showing power capture achieved at various distances between the reaction member and the energy capturing float using an exemplary wave generator according to the invention.

The results of our computational model of the effect of increasing the distance D3 between the energy capturing float 2 and the reaction member 1 are shown graphically in FIG. 12. It can be seen that increasing the distance D3 between the reaction member 1 and the energy capturing float 2 leads to an increasing period at which the energy capture by the generator attains a peak.

A second mechanism by which a generator according to the invention can adjust its geometry will be described with reference to FIGS. 13 and 14.

Specifically, the connecting lines 4a,4c are connected to the respective energy converters 3a,3c by pulleys 5a,5c that are adjustably mounted on tracks 6a, 6c that allow the pulleys to be moved toward or away from the respective energy converter 3a, 3c.

Figure 13:
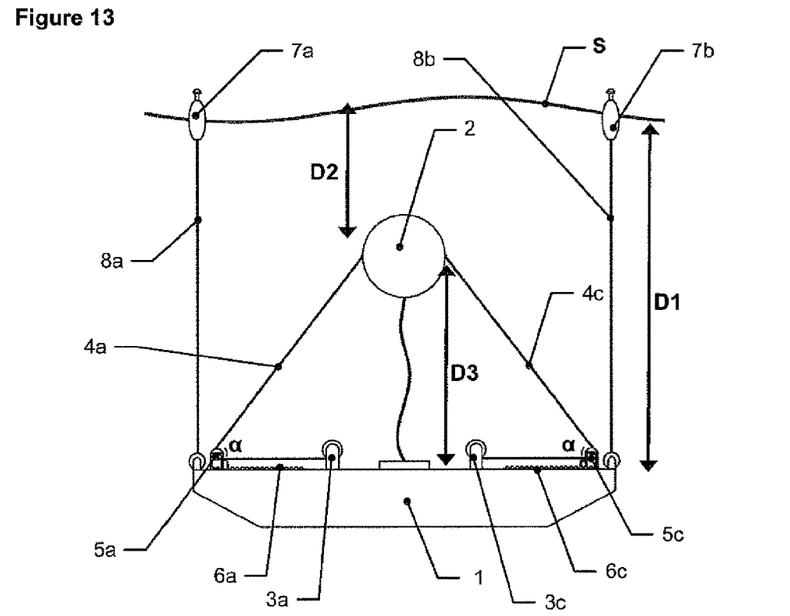
FIG. 13 is a view similar to that of FIG. 7, showing more details of the pulleys in a first disposition, being one in which they are furthest spaced from one another.
Figure 14:
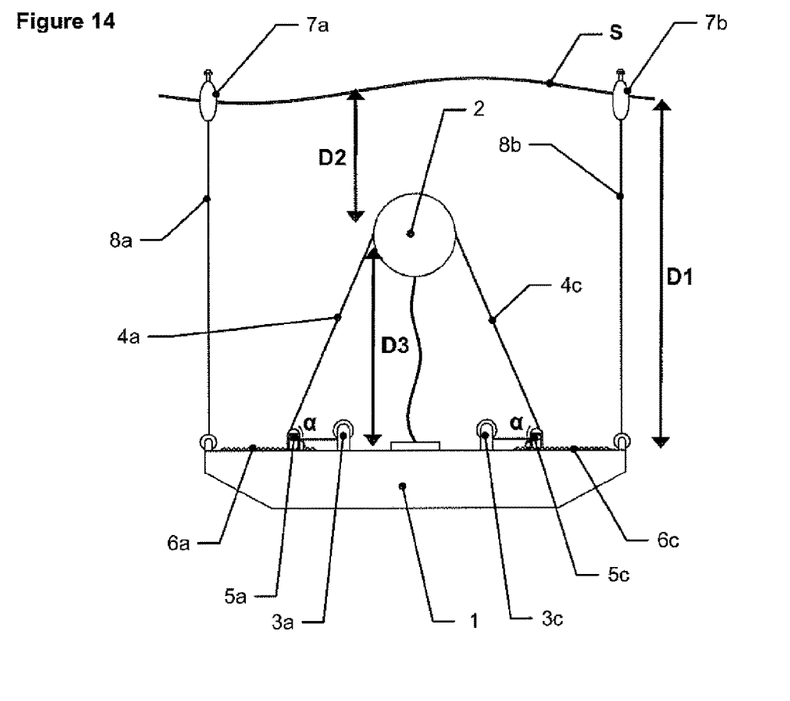
FIG. 14 is a view similar to that of FIG. 7, showing details of the pulleys in a further disposition in which they are relatively closer.

FIG. 13 shows the pulleys 5a, 5c adjusted to be relatively close to the energy converters 3a,3c and FIG. 14 shows the pulleys 5 adjusted to be relatively distant from the energy converters 3a, 3c.

Therefore the angle α, being the angle between the horizontal and respective lines 4a, 4b, is adjusted in a similar way to when the distance from the energy capturing float 2 to the reaction member 1 is adjusted as described above. Therefore the change to the response of the system is also similar, and moving the pulleys 5a, 5c towards the respective energy converters 3a, 3c will increase the angle α and tune the response of the system towards longer wave period sea states. Conversely moving the pulleys 5a5c away from the energy converters 3a3c will decrease the angle α and tune the response of the system towards shorter period sea states.

It should be noted that in FIGS. 13 and 14, only two lines 4a,4b and corresponding converters 3a, 3c etc are shown; it will be apparent that more than two such combinations of lines, converters etc are envisaged.

Figure 15:
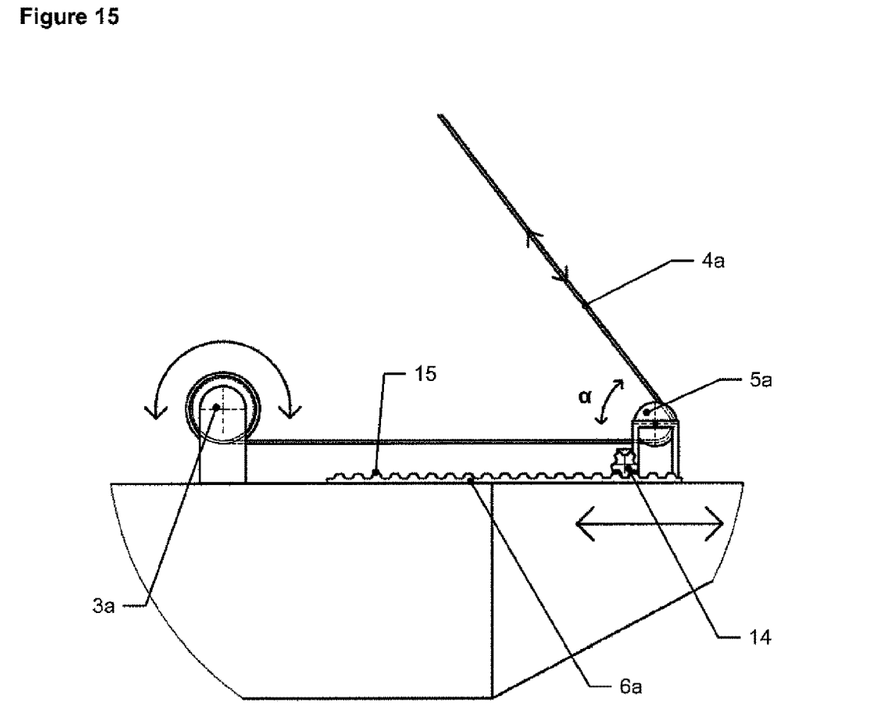
FIG. 15 is a close up of a rack and pinion and pulley 5a in the arrangement of FIG. 2.

In the detailed illustration of FIG. 15, the respective pulley 5a can be moved back or forth along the track 6a by way of a respective pinion 14 on the pulley 5a and a rack 15 on the track 6a. The track 6a includes a pinion 14 to be operated by a drive motor (not shown) and a rack 15 which is fixed to the reaction member 1.

It will be appreciated that other methods of adjusting the position of the pulleys 5a etc are possible. For example a hydraulic ram or a helical drive could be used to achieve a similar effect to the rack 15 and pinion 14 of the illustrated embodiment.

It will also be appreciated that the pulleys 5a etc could be omitted and the energy converters 3a etc could themselves be directly moved along the tracks with the connecting lines being fed directly onto respective drums (such as drum 11a as shown in FIG. 5) from the energy capturing float 2.

The above described embodiments illustrate mechanisms by which the generator according to the invention can change its geometry to adjust its response to different wave heights and sea states in order to optimise both the energy capture and survivability of the apparatus.

It should, however, be noted that any combination of energy capturing float 2 depth; distance between the energy capturing float 2 and the reaction member 1; and distance between the respective pulleys 5a,5b,5c,5d and the energy converters 3a,3b,3c,3d is possible. The apparatus is not limited to the illustrated embodiments.

Figure 16:
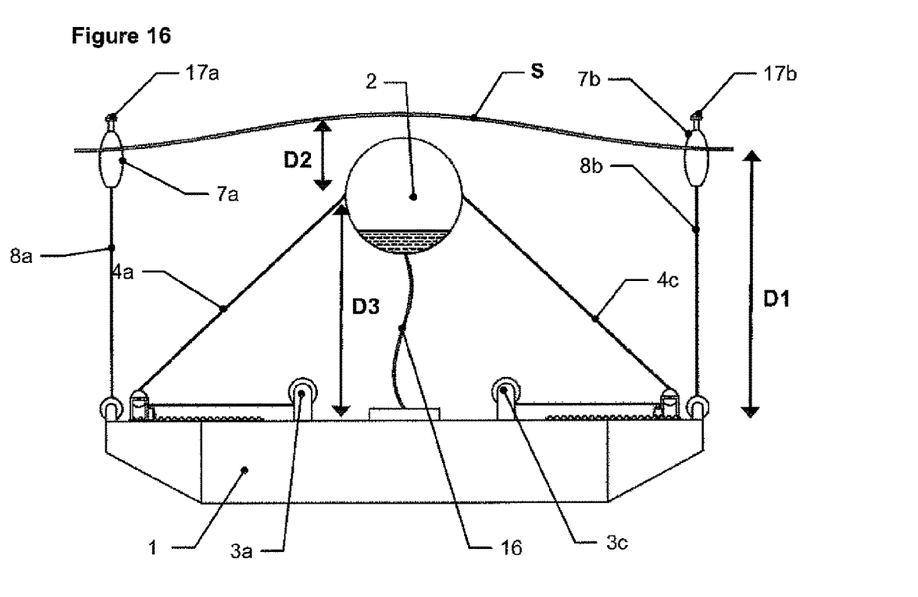
FIG. 16 is a sectional view of a generator according to the invention showing the float substantially empty of water and therefore with a low mass.
Figure 17:
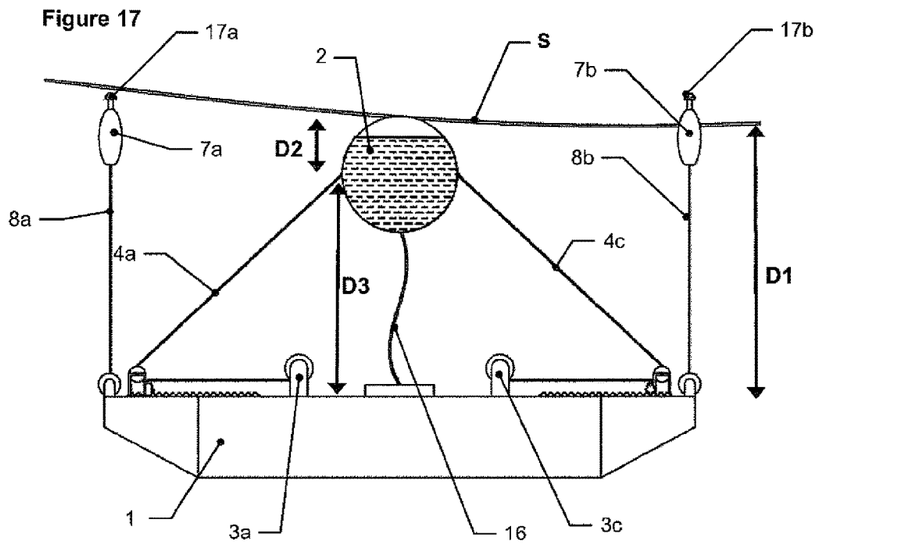
FIG. 17 is a sectional view of a generator according to the invention showing the float substantially full of water and therefore with a high mass.

A further mechanism by which a generator according to the invention can tuned to varying sea states will now be described with reference to FIGS. 16 and 17.

The mass of the energy capturing float 2 can be adjusted by adjusting the proportion of air and water contained within the float 2. FIG. 16 shows the main energy capturing float 2 relatively empty of water with a low mass and FIG. 17 shows the main energy capturing float 2 relatively full of water with a high mass. Mass tuning (as it is commonly known) allows the response of the energy capturing float 2 to be optimised for different sea states leading to an increase of the overall energy capture of the apparatus.

Increasing the mass of the energy capturing float 2 generally tunes the response of the float to longer wave periods. Therefore the effect of mass tuning the main energy capturing float 2 and the effect of tuning due to adjusting the geometry of the apparatus (as described above) can be additive for a greater tuning effect.

Because adjusting the mass of the energy capturing float 2 will change its buoyancy B1 (see FIG. 2) the overall buoyancy of the complete system is maintained by making a corresponding adjustment to the buoyancy of the reaction member 1 and therefore its submerged weight W (that is, if water is added to the energy generating float 2 then air is added to the reaction member 1).

Alternatively, the reduction in buoyancy of the energy capturing float 2 can be counteracted by an increase in the depth of the submergence of the surface floats 7a, 7b (that is, as B1 decreases, B2 increases to compensate, and the overall buoyancy of the system is maintained and remains equal to the submerged weight W of the reaction member 1).

To allow air to be added to, or removed, from the energy capturing float 2 and the reaction member 1, a separate snorkel line 16 is provided from the reaction member 1 to the energy capturing float 2. A compressor (not shown) on or in the reaction member 1 allows air to be pumped from above the sea surface into the reaction member 1 or into the float 2.

The provision of an air supply to the reactor member 1 and the float 2 allows the pressure of the air in the reactor member 1 and the float 2 to be equalised to the ambient pressure at the depth of operation, depending on the variable depth of operation as described above.

To allow air to be added to, or removed from, the energy capturing float 2 and the reaction member 1, the depth setting lines 8a, 8b can also contain snorkels (i.e. be tubular or be comprised of a pair of lines, one solid for strength and one tubular to transfer air) to bring air from the surface to the reaction member 1. Air inlets 17a, 17b can be provided in the surface floats 7a, 7b.

A compressor (not shown) is provided on or in the reaction member 1 to allow air to be pumped from the surface into the reaction member 1 or into the float 2.

The provision of an air supply to the reactor member 1 and the float 2 allows the pressure of the air in the reactor member 1 and the float 2 to be equalised to the ambient pressure at the depth of operation, depending on the variable depth of operation as described above.

Reference will now be made to the second embodiment shown in FIGS. 18 and 19. As with the first embodiment, the second embodiment comprises a submersible reaction member 1; an energy capturing float 2 that moves in response to the waves; a series of energy converters 3a, 3b,3c, 3d mounted on the reaction member 1; respective connecting lines 4a, 4b, 4c,4d of adjustable length that connect the energy capturing float 2 to the respective energy converter 3a, 3b,3c, 3d via a respective pulley 5a, 5b, 5c, 5d, each of which pulleys is adjustably mounted on a respective track 6a, 6b. 6c, 6d. (As indicated above, for reasons of clarity, not all of these features are illustrated in detail or labelled in FIGS. 18 and 19.)

In contrast to the first embodiment, the second embodiment does not include surface floats 7a,7b and depth setting lines 8a,8b to control the depth D1 of the reaction member 1. Instead the mooring lines 9a,9b of the second embodiment control the depth of the reaction member 1 by being adjustable in length. This is achieved by the mooring lines 9a,9b being attached to the reaction member via winches 18a, 18b (similar to the winches 13a,13b that attach the depth setting lines to the reaction member 1 in the first embodiment).

In order for the mooring lines 9a,9b to be able to control the depth D1 of the reaction member 1, the entire apparatus must be constantly trying to float to the surface and be prevented from doing so by the mooring lines 9a,9b. Therefore in the second embodiment the buoyancy B1 of the energy generating float is greater than the weight W of the reaction member 1, and the net buoyancy force is resisted by tension T in the mooring lines 9a,9b.

Figure 18:
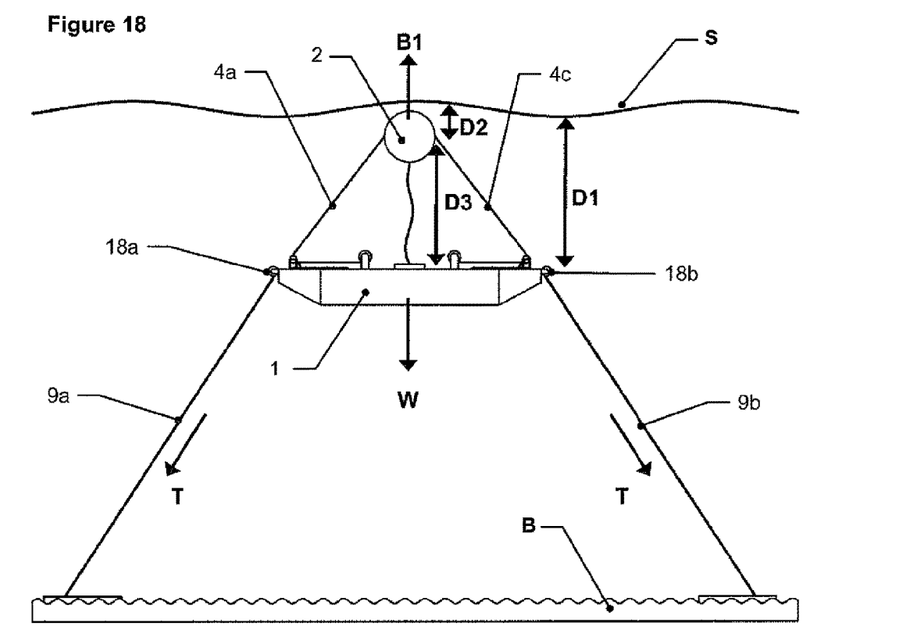
FIG. 18 is a view of a further embodiment in which the reaction member is adjusted or set to a shallow depth by lengthening the mooring lines.
Figure 19:
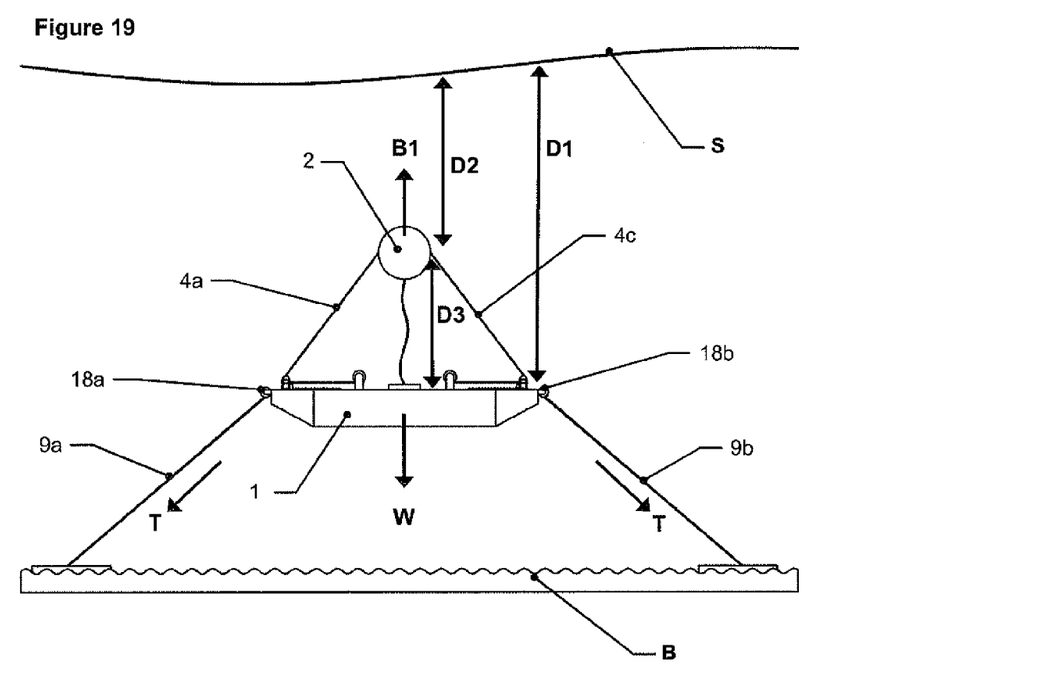
FIG. 19 shows the embodiment of FIG. 18 in which the reaction member is adjusted or set to a greater depth by shortening the mooring lines.

FIG. 18 shows the reaction member 1 adjusted to a shallow depth by lengthening the mooring lines 9a,9b whilst FIG. 19 shows the reaction member 1 adjusted to a greater depth by shortening the mooring lines 9a,9b.

As with the previous embodiment, the distance D3 between the energy generation float 2 and the reaction member 1 can be adjusted independently of the depth D1 of the reaction member 1 by changing the length of the respective connecting lines 4a,4c. Also as per the previous embodiment the angle of the connecting lines to the horizontal can be adjusted independently by changing the position of the pulleys in the tracks. Furthermore the mass of the energy capturing float 2 can be adjusted as in the first embodiment by changing the ratio of air and water contained therein.

The invention claimed is:

1. A generator for converting wave motion in a body of water to useful energy, the generator comprising:
    at least one energy capturing float which is movable in response to said wave motion;
    a reaction member positioned below the energy capturing float and wholly submerged in the body of water;
    a connector configured to connect said at least one energy capturing float to said reaction member and to define a vertical spacing between said energy capturing float and said reaction member;
    an energy converter for converting relative movement between said reaction member and said at least one respective energy capturing float to the useful energy; and
    a depth setting mechanism configured for setting the submerged depth of the reaction member in the body of water,
    wherein the connector is of adjustable length configured to independently adjust the vertical spacing between the energy capturing float and the reaction member, and to adjust the depth of the energy capture float in the body of water, said adjustments being independent of the depth of the reaction member.

2. A generator according to claim 1, in which the connector comprises at least one flexible line, the reaction member further having at least one drum around which the flexible line may be wound to achieve length adjustment of respective flexible line.

3. A generator according to claim 1, which further comprises an adjustable mounting of the connector on the reaction member such that the geometry of the connector can be altered.

4. A generator according to claim 3, in which the adjustable mounting comprises at least one primary connection point of the connector to the reaction member in a respective track that permits movement of the respective connection point across the reaction member.

5. A generator according to claim 4, in which the primary connection point comprises a pulley that can be moved in the respective track by a driven pinion on the respective pulley, which pinion mates with a fixed rack on the reaction member.

6. A generator according to claim 1, wherein said energy capturing float is arranged for variation of the mass thereof by varying the proportion of air and water contained therewithin.

7. A generator according to claim 6, wherein varying the proportion of air and water in the energy capturing float is achieved by the provision of an air supply to the float from the reaction member and the provision of an air supply to the reaction member from the surface of the body of water.

8. A generator according to claim 1, wherein the depth setting mechanism comprises at least one flexible attachment line of adjustable length, each said attachment line being attached to a respective buoyancy means.

9. A generator according to claim 8, which has a net negative buoyancy that is supported by the buoyancy float on the surface of the body of water, the buoyancy float being attached to the reaction member by the flexible attachment line.

10. A generator according to claim 1, wherein the depth setting mechanism comprises at least one flexible mooring line of adjustable length- to adjustably position the reaction member above a bed of the body of water.

11. A generator according to claim 10, wherein the generator has a net positive buoyancy that is resisted by tension of the at least one flexible mooring line.

12. A generator according to claim 1, wherein the depth setting mechanism is coupled to the reaction member by a winch.

13. A generator according to claim 2, which further comprises an adjustable mounting of the connector on the reaction member such that the geometry of the connector can be altered.

14. A generator according to claim 13, in which the adjustable mounting comprises at least one primary connection point of the connector to the reaction member in a respective track that permits movement of the respective connection point across the reaction member.

15. A generator according to claim 14, in which the primary connection point comprises a pulley that can be moved in the respective track by a driven pinion on the respective pulley, which pinion mates with a fixed rack on the reaction member.

16. A generator according to claim 2, wherein the depth setting mechanism comprises at least one flexible attachment line of adjustable length, the or each said attachment line being attached to a respective buoyancy float.

17. A generator according to claim 16, which has a net negative buoyancy that is supported by the buoyancy float on the surface of the body of water, the buoyancy float being attached to the reaction member by the flexible attachment line.

18. A generator according to claim 17, wherein the depth setting mechanism comprises at least one flexible mooring line of adjustable length to adjustably position the reaction member above a bed of the body of water.

19. A generator according to claim 18, wherein the generator has a net positive buoyancy that is resisted by tension of the at least one flexible mooring line.

20. A generator according to claim 4, wherein the depth setting mechanism comprises at least one flexible attachment line of adjustable length, the or each said attachment line being attached to a respective buoyancy float.

21. A generator according to claim 20, which has a net negative buoyancy that is supported by the buoyancy float on the surface of the body of water, the buoyancy float being attached to the reaction member by the flexible attachment line.

22. A generator according to claim 4, wherein the depth setting mechanism comprises at least one flexible mooring line of adjustable length to adjustably position the reaction member above a bed of the body of water.

23. A generator according to claim 22, wherein the generator has a net positive buoyancy that is resisted by tension of the at least one flexible mooring line.

* * * * *